United States Patent
Snow et al.

(10) Patent No.: US 8,560,412 B2
(45) Date of Patent: Oct. 15, 2013

(54) METHOD AND APPARATUS FOR FINANCIAL INVESTMENT ADVICE AVAILABLE TO HOST OF USERS OVER A PUBLIC NETWORK

(75) Inventors: Bill Snow, Toronto (CA); Stephen B. Sutherland, Aurora (CA)

(73) Assignee: TrueGenius, Inc., Aurora, ON. (CA)

( * ) Notice: Subject to any disclaimer, the term of this patent is extended or adjusted under 35 U.S.C. 154(b) by 1220 days.

(21) Appl. No.: 11/437,792

(22) Filed: May 22, 2006

(65) Prior Publication Data

US 2007/0038544 A1    Feb. 15, 2007

Related U.S. Application Data

(63) Continuation of application No. 09/570,814, filed on May 15, 2000, now abandoned.

(51) Int. Cl.
    *G06Q 40/00*    (2012.01)

(52) U.S. Cl.
    USPC ............... 705/35; 705/36 R; 705/37; 705/39; 705/31; 709/200; 709/202

(58) Field of Classification Search
    USPC ............... 705/36 R, 37, 39, 31; 709/200, 202
    See application file for complete search history.

(56) References Cited

FOREIGN PATENT DOCUMENTS

WO    WO 98/44444    10/1998

*Primary Examiner* — Daniel Felten

(57) ABSTRACT

The investment arrangement funnels the knowledge and strategies of a host of advisors through an impartial system leveraged by a host of investors to access, evaluate and then easily invest in one or more strategies. Investment is made by an investment company which acts as a holding company for the investor. The advisor provides instructions to the investment company regarding buy and sell instructions. The strategy of each advisor is clearly stated and investments are restricted to the strategy. The investment company provides a database of all trades by an advisor so that both actual and relative performance can be measured.

8 Claims, 11 Drawing Sheets

VCM Investments — Share your picks for profit

Bill's Internet Technology Fund
Bill Snow, Advisor

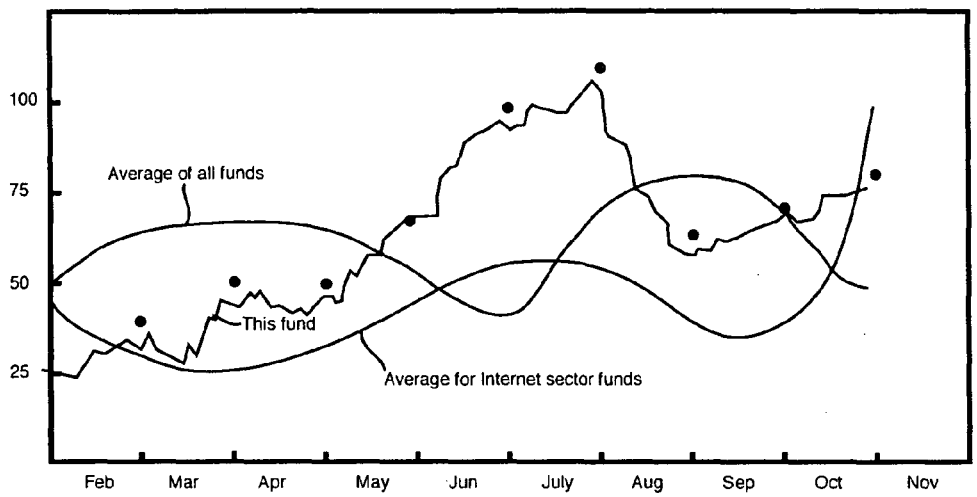

Compare Results with [ ]

Fund Category: Internet & E-commerce Related Funds
Specification Mechanism: Proportional

| Asset | Market Price | Your Holdings | Total Holdings | Specification (Actual) |
|---|---|---|---|---|
| Sun Microsystems | $ 85.00 | $ 51.75 | $3,705.96 | 25% (23.5%) |
| Open Graphics | $ 106.75 | $160.91 | $11,523.21 | 75% (73.1%) |
| Cash | $1.00 | $7.36 | $527.07 | 0% (3.4%) |
| Total | n/a | $220.02 | $15,756.24 | 100% |

Recent Changes
Your advisor Bill Snow has made the following changes to the portfolio in the past week (times in EST)
13:14, Dec 10: Adjusted specifications to: Sun Microsystems 25%, Open Graphics 75%, Cash 0%
10:09, Dec 5: Adjusted specifications to: Sun Microsystems 10%, Open Graphics 75%, Cash 15%
22:47, Dec 1: Adjusted specifications to: Open Graphics 50%, Cash 50%
20:32, Nov 28: Initiated the fund with portfolio: Cash 100%
See the complete change log for this fund Advisor Restrictions
Your advisor Bill Snow describes this fund as "an Internet technology fund, which invests in companies whose primary business is intimately related to the Internet. Growth of the fund should track the growth of the Internet. Details can be found here This fund is restricted to investment in the following securities, selected by your advisor as representative of the fund's investment strategy.

- Sun Microsystems
- Open Graphics
- Amazon.com
- VCM Investments
- Ebay
- E*trade Group Read details about how advisor restrictions work.

Discussion.
- Unsubscribe from the mailing list
- Set your mailing options
- View recent messages

Joe's Internet Technology Fund

My personal investment portfolio has been growing very quickly since 1995, at a rate around 100% per year. Now I'm going to start sharing my wealth with friends, colleagues, and strangers on the Internet. I know a lot about the technology industry, and now you can tap my knowledge to help your investment portfolio. Read about the company that makes this possible here, and buy in to my Advisor Fund here.

I am an electrical engineer, currently working at a top-secret Internet startup in Silicon Valley. I have the inside track on Internet stock because I'm in the business, and I'm well connected in the industry. My stock picks are my personal portfolio, so I only pick in my list that I really believe in.

Take a look at some of the picks I've made:
- bought Microsoft in 1985
- bought Apple in 1986
- bought Sun in 1992

None of my best picks are recorded in th VCM system, because I made them before the system was available. I will make stock picks just as good again many times.

Hot Stock Picks

The only way to get in on my stock picks as they happen is to buy in to my Advisor Fund. Some of my latest picks are here:
- Buy Sun I have a friend that works at Sun, and he said that he heard Scott McNealy has been going to a lot of secret meetings with Bill Gates. He doesn't know exactly what's going on, but he said that whatever it is, it will be very big.
- Buy Green Mango Software. They are a new Internet company that just IPOed two weeks ago. They went from $15 to $150 in that time, and the price continues to rise. I have a friend that works there who says the engineering team is great.

Fig. 10

VCM Investments 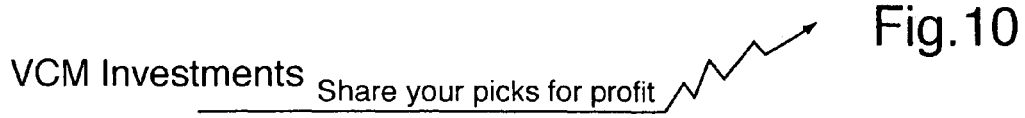 Share your picks for profit

Advisor Fund Construction
Step 2: Fund Restrictions
By creating a fund now, you make it available to investors worldwide through all
of the VCM investment web sites. This does not mean that people will invest in the
fund right away, however. In order to build up investment trust, VCM can automatically
limit your trading using whatever restrictions you choose. Your investors will take
comfort in the fact that VCM will enforce these restrictions, and may trust the fund more
than they trust you.

Restrictions are especially important when a fund is first started, and for first-time fund
advisors, since the investment community will tend to trust older, more established funds
first. Help your investor trust you by making some guarantees about what your actions will be.

- ☐ investment picks are limited to list to be declared, identified in advance, of selected equities. (This list will only be constructed if this restriction is selected, and the fund construction system will guide you through the process)
- ☐ investment picks are limited to selected exchanges (for example, NYSE, Nasdaq, TSE). (The list will only be constructed if this restriction is selected)
- ☐ investment picks are limited by nationality. Only investments from the following countrys are allowed: ⌐Canada
- ☐ The following minimum percentage of the assets of the fund will be held in cash or government-backed bonds: ⌐29%
- ☐ investment picks must always be in publicly traded vehicles
- ☐ I will have minimum Of $ ⌐5000 invested of my own money in the fund
- ☐ investment strategy prevent more than ⌐10% of total funds being invested in any given equity
- ☐ investment on margin is limited to ⌐10% of th value of the fund
- ☐ Stocks are restricted to companies with a minimum market capitalization of $ ⌐10,000,000
- ☐ Stocks are restricted to companies with a maximum market capitalization of $ ⌐100,000,000
- ☐ Stocks are restricted to companies with a minimum revenue of $ ⌐1,000,000 annually
- ☐ Stocks are restricted to companies with a minimum total asset value of $ ⌐1,000,000
- ☐ Stocks are restricted to companies which have been listed for more than ⌐3 months
- ☐ Stocks are restricted to companies which have been listed for less than ⌐5 years
- ☐ Minimum number of different investments will be held is ⌐5
- ☐ Maximum number of different investments will be held is ⌐50

[ Continue to step 3 ]

Fig. 11

VCM Investments
Share your picks for profit

My Portfolio
Funds

| Fund | Current Value | Book Value | Day's Change | Sell |
|---|---|---|---|---|
| Internet Technology Fund | $ 9,000.27 | $10,000 | + $35.97 | O |
| Internet Casinos | $10,265.00 | $10,000 | - $42.63 | O |
| Florida Oranges | $ 16,000.00 | $10,000 | + $99.25 | O |
| Total | $ 35,265.27 | $ 30.000 | + $92.59 | O |

Top 5 security exposures

| | Security | Current Total Value | Percentage of Portfolio |
|---|---|---|---|
| 1. | IBM | $ 4,000.00 | 11.3% |
| 2. | Red's Oranges | $ 3,289.22 | 9.3% |
| 3. | Galaxiworld.com Ltd. | $ 975.00 | 2.8% |
| 4. | Cryptologic | $ 923.24 | 2.6% |
| 5. | Gametronics | $ 775.94 | 2.2% |

<u>View</u> the entire portfolio by security

METHOD AND APPARATUS FOR FINANCIAL INVESTMENT ADVICE AVAILABLE TO HOST OF USERS OVER A PUBLIC NETWORK

This is a Continuation Application of U.S. patent application Ser. No. 09/570,814 filed in the United States Patent Office on May 15, 2000.

FIELD OF THE INVENTION

The present invention relates to a method and system for receiving and considering investment advice and investing in accordance with such investment advice.

BACKGROUND OF THE INVENTION

The present application is directed to a financial investment system which is available to a host of users over a public network.

The INTERNET has introduced new ways for carrying on business and provides individuals with a simple procedure for investigating new purchases. Webpages have replaced physical places of business and also act to market the particular wares or services of particular companies and individuals. Such webpages typically, are freely available to anyone having a computer and INTERNET access. The wide access to a host of potential clients and the ability to inexpensively provide detailed information to such clients has changed the way business is conducted.

Investors now have the capability of tracking their investments over the INTERNET as well as conducting research and providing instructions with respect to trades through online brokers. An investor can research a host of different mutual funds which all allegedly reduce the investment risk due to diversification. These mutual funds are managed by an advisor or fund manager and provide an effective investment vehicle, particularly where the amount to be invested is small. A certain fee is paid by the investor for the professional expertise provided in the administration and investment direction of the fund. The individual investor does not have any control of the fund other than whether to invest or divest themselves of the particular fund. The amount of timely information that is available with respect to actual trade activities of the fund is limited and summarized. Therefore, the actual day to day decisions of the fund manager are hidden and difficult, if not impossible, to evaluate.

A different form of investing is direct purchase of stocks through a broker or electronic discount brokerage service. In the case of a broker, the stock selection is ultimately determined by the investor but this decision is often made based on the broker's recommendation. Research can be provided to assist the investor in evaluating the recommendations. Independent third party tracking of the particular advice provided by the broker is not normally available and thus, it is typically up to the investor to record and maintain such data. This requires considerable discipline and typically is inaccurate over time.

Another issue with respect to a broker is the possibility of "churn", which refers to the practice of buying and selling stocks for the primary purpose of increasing commissions without necessarily creating additional value for the investor. This practice is difficult for the individual investor to evaluate and leads to increased uncertainty.

Investors are often influenced by "a hot tip". The "hot tip" may originate with a friend or colleague who is recommending a particular stock. On occasion, brokers also contact investors recommending a particular investment. Nervous or careful investors may be concerned due to a possible conflict of interest. It would be desirable to have historical data with respect to the performance of the broker's recommendations over time. Similar tracking of the performance of a colleague's previous recommendations would be desirable to assist the investor in making a sound financial decision. Further, there is no independently audited information as to whether the provider of such "hot tip" actually acted on his/her own advice. In fact, it has been an investment industry practice to specifically deny any correlation between advice and actual trading activities. In some cases, a broker may be recommending to buy a given stock while his/her brokerage is in fact selling.

Some investors group together and form a stock club and purchase investments on their group's behalf. It would also be desirable for individual club members to be able to consistently evaluate the stock club's performance relative to other investor's funds and to provide a more convenient vehicle for individual members of the club to join or leave in an equitable manner.

The present invention addresses a number of these problems and provides a different method and system for investment.

SUMMARY OF THE INVENTION

The present invention is directed to an online investment arrangement. The arrangement includes a series of advisor webpages, where each webpage promotes a particular investment strategy that will be followed by a given advisor. Each advisor webpage provides a link to a corresponding webpage of an investment entity. The webpage of the investment entity includes a certified definition of the investment strategy that has been selected and allows an investor to invest according to the stated strategy while maintaining the advisor in a capacity of guiding the investing decisions in accordance with the stated strategy. In this way, an account is established for each investor and funds are invested in one or more selected investment strategies.

According to an aspect of the present invention, an online investment method comprises the steps of an investor viewing, using a computer, a host of investment strategies promoted by self proclaimed advisors, selecting using the computer, a particular investment strategy for investing, receiving information at the computer from a licensed investment entity providing confirmation of the investment strategy and requiring information necessary for investing according to a selected investment strategy, transmitting using the computer the required information for investing and providing the funds necessary for investment to the investment entity. The investment entity invests according to the strategy on behalf of the investor.

A computer online investment system, according to the present invention, comprises a host of investment advisors of widely varying backgrounds and experience. These backgrounds and experience are not limited to conventional mutual fund advisors. Each investment advisor makes available by an online computer system, their investment strategy and limitation with respect to future investments, their qualifications or justification for the basis of the investment strategy together with a computer link to an investment company. The investment company is qualified to open and maintain accounts for investors and to purchase and hold investments or shares in investments on their behalf. The investment company includes the capability to invest for an investor according to a selected investment strategy taken from the investment strategies of the advisors when so instructed by the investor.

The investment company seeks instructions of any advisor with respect to the investment of additional funds available from new investment instructions received from investors that selected the particular advisor's strategy. The company invests according to the instructions received from the advisor given that the instructions comply with the stated investment strategy and limitations of the advisor.

According to an aspect of the invention, the investment company operates an online computer system available to the investor and each advisor's strategy is available on said system as well as financial research data to assist in the assessment of the strategy over time.

According to yet a further aspect of the invention, the online computer system includes historical investment information with respect to any of the investment strategies, to allow independent evaluation of the strategies by an investor prior to investing.

According to yet a further aspect of the invention, the historical investment information includes detailed stock trade information and timing thereof relative to the current prices, volumes, and highs and lows over arbitrary periods commensurate with such stock trades.

According to yet a further aspect of the invention, the online computer system allows an investor to submit queries with respect to a selected investment strategy, which queries include the capability to investigate the timing of stock trades and the price thereof on an ongoing basis such that real assessment of the investment strategy on a current basis can be carried out.

A computerized online system for investing in mutual funds or similar funds according to the present invention, comprises a database of possible advisor funds accessible over a public network using a computer. The database includes for each advisor fund, a stated investment strategy to which investments of the fund will be limited. The database provides financial performance measurements for each advisor fund and additionally, accommodates user defined criteria associated with trades of the advisor funds for investigating the advisor funds. The database also includes a link back to the advisors' webpages and may also store historical copies of the advisors' pages so that potential investors cannot only view the current narrative of the advisor but can also review prior narratives.

According to yet a further aspect of the invention, an advisor may instruct the investment company to cap the fund thereby preventing new investment investors from joining. This might be regarded by an advisor to ensure that the overall size of a given fund does not make it difficult to quickly move in and out of security postings in small cap stocks, for example.

The online system preferably includes a series of performance evaluation tools which the investment company has developed to assess the performance of different advisors.

The online system accommodates investors opening an account for the purpose of investing, including investing in any of the mutual funds. At least some of the mutual funds include non conventional advisors promoting investment according to their stated strategy. The non conventional advisors receive information with respect to additional funds received for investment according to their stated strategy and the advisor provides instructions to the online system with respect to the particular investment to be made with the additional funds. The advisors further provide buy and sell instructions to the online system to effect management of their respective fund in accordance with the stated strategy.

The non conventional advisors may also specify a proportional portfolio strategy whereby they specify a selection of companies and a corresponding percentage range that the volume of each equity should comprise of the total funds available. The investment company will adjust through automatic buy and sell orders, the portfolio such that the investment strategy is upheld.

According to yet a further aspect of the invention, the computerized online system includes some of the non conventional advisors having separate webpages promoting their investment strategy and providing a link to the online system.

According to yet a further aspect of the invention, the online system is operated by a licensed brokerage.

According to yet a further aspect of the invention, each advisor receives compensation based on investors selling the particular advisor fund and realizing a profit.

According to yet a further aspect of the invention, each advisor receives an incentive bonus from the investment company if such advisor invests his/her own money in the particular advisor fund he/she is advising. If the advisor makes it known to investors that he/she was his/her own fund, such investors will be given an opportunity to automatically sell out of such fund if such advisor removes his/her personal monies from such fund. If the investment strategy is provided by an "automated" system, the investment company pays no advisor's fees.

According to yet a further aspect of the invention, the advisor does not receive any compensation with respect to the purchase or sale of investments for the particular fund. With this arrangement, the advisor is separated from any transaction fees associated with the buy and sell of stock according to his recommendations, and as such, does not have a conflict of interest.

According to yet a further aspect of the invention, the system may accommodate modification of any stated strategy by a particular advisor, after appropriate notice has been provided to the investors in the fund. Basically, any modification of a strategy will require agreement with the operator of the online system who provides appropriate notice to the investors.

According to yet a further aspect of the invention, the advisor or investment company can decide who may receive information about the investment strategy, and who may correspondingly invest in such strategy. This accommodates limited or private advisor funds.

According to yet a further aspect of the invention, some of the advisors are provided by the online system with a specified fictitious dollar amount to be invested by the advisor and identified to would be investors as fictitious. This allows the advisor to establish a track record for his investment strategy without actual dollars being invested in the fund. In this way, advisors can gain recognition without full funding.

BRIEF DESCRIPTION OF THE DRAWINGS

Preferred embodiments of the invention are shown in the drawings, wherein:

FIG. 8 is an example of a webpage summary of an advisor maintained by the investment company;

FIG. 9 is an example webpage of an advisor that is maintained by the advisor separately;

FIG. 10 is a webpage showing example fund restrictions which might be specified by an advisor when creating a fund with the investment company; and FIG. 11 is a webpage report from the investment company showing a particular investors' portfolio and the security exposure of the collective portfolio.

DETAILED DESCRIPTION OF THE PREFERRED EMBODIMENTS

Figure 1:
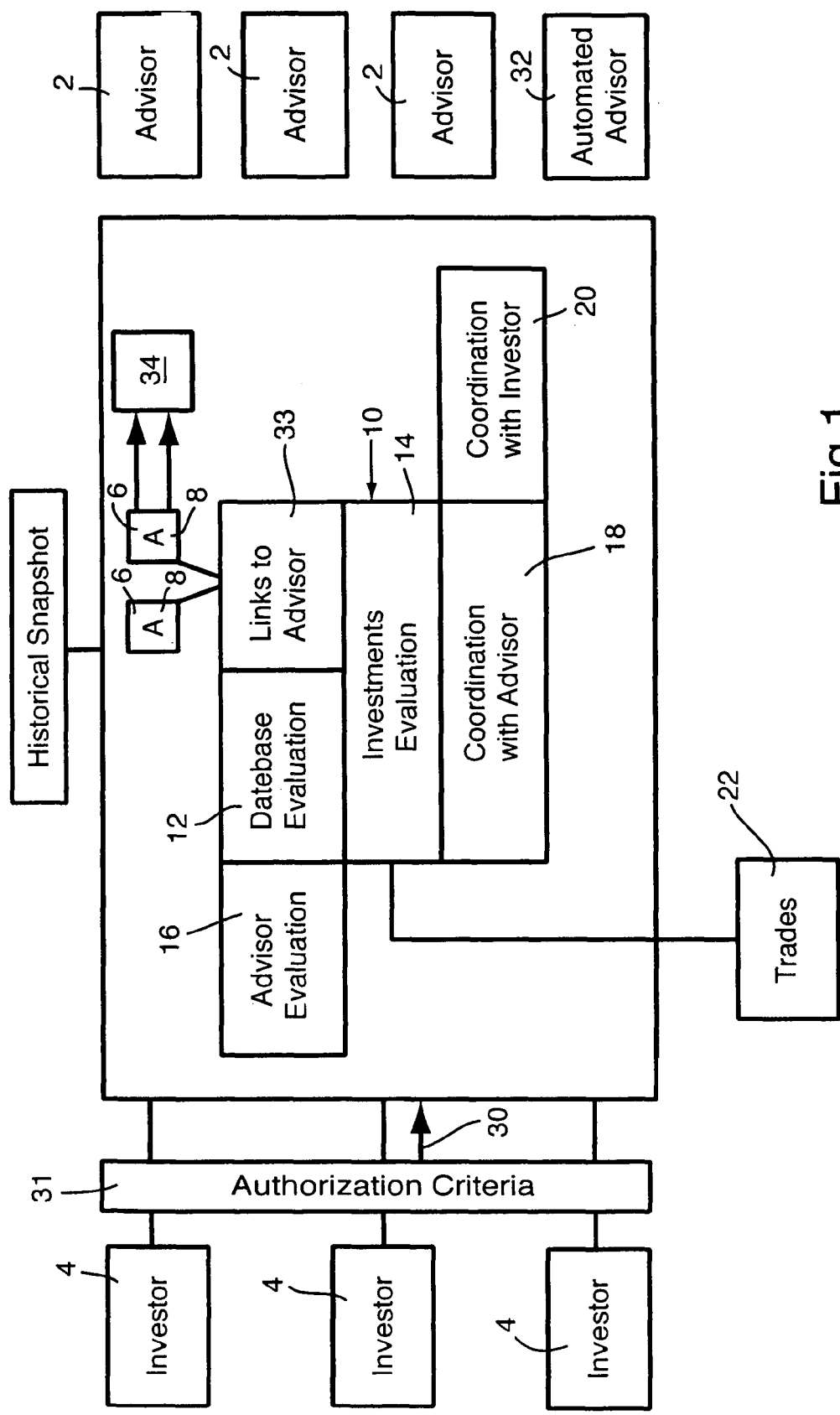
FIG. 1 shows an online computer based investment system which uses the INTERNET to allow investors to review investment strategies of different advisors and to evaluate the performance of the advisor's strategy including trade executions.

FIG. 1 shows an overview of the investment system 1. This system allows a diverse group of advisors to use webpages to promote their investment strategy and a much larger diverse group of investors to review these strategies and make informed investment decisions. The system recognizes that the expertise of advisors is quite diverse and individual investors can benefit from this knowledge if it is provided to them in an effective manner. The system allows both the advisors and the investors the benefit of using a licensed brokerage or other qualified company as an intermediary between an advisor and the investor. Any investments are protected and the advisor merely provides investment instructions. The brokerage service in contrast is not recommending any of the investment strategies and is not confirming the qualifications of the advisors or their promotional statements. However, the brokerage does ensure that the investment strategies of each advisor are adhered to and that no investments will be made outside of the strategy. In addition, the stocks or investments purchased according to the fund are held by the brokerage on behalf of investors.

The system of FIG. 1 uses the INTERNET or other network for allowing investors to consider and research different investment advisors who are promoting their investment advice. The advisors 2 are linked by a computer or otherwise arrange for an advisor webpage 6 to be available on the web.

The advisors are responsible for the content of their webpages 6. These advisor pages link 8 to a series of corresponding webpages 33 maintained by the investment company. These webpages 33 carry factual current performance and historical data, concerning advisor funds, certified by this investment company. Each webpage 33 is preferably of a standard type format which is determined by the investment company and contain links back to their company advisor webpages 6.

The individual webpages 6 of the advisors could be consolidated in one place, however, in most cases, they will be provided on separate servers determined by the advisors and paid for by the advisors. As noted above, they include a link 8 to the computer server 10 of the investment company and specifically, to the webpage 33 maintained for each advisor by the investment company.

Individual investors, using their computers 4, can logon the system and either review individual webpages 6 of different advisors, certified webpages 33, or can query the computer system 10 of the investment entity. This computer system allows for extensive database evaluation which is shown as including investment evaluation 14 and advisor evaluation 16. In particular, the database 12 can be queried by potential investors, and/or actual investors to review and consider investments. The database could be queried to rank different advisors or to allow evaluation of one advisor according to a particular strategy. For example, if an investor was considering investing according to the investment strategy of a particular advisor, he could review the actual trades made by that advisor over the last several months and in particular, look at buy and sell points of different stock purchases or transactions that were made by the advisor, relative to the daily, monthly, or yearly performance of the stock. Did he buy low and sell high?

The entire database can be evaluated using general criteria determined by the potential investor and advisors and selections which meet the particular criteria can be displayed. For example, an investor may wish to look at any advisor where there has been at least a 20 percent return over the last three months and the fund includes at least two of six possible stocks. The database will have extensive detailed information with respect to the actual trades made by the individual advisors and the timing thereof. This is in direct contradiction to conventional mutual funds where it is difficult to determine precisely, when stocks have been added and whether they were added as "window dressing" near the end of a reporting period. Furthermore, the actual trades with respect to stocks and the timing thereof, are not typically provided by conventional mutual funds.

With the system as described above, it will be possible to have not only evaluation of relatively recent and new investment strategies of different advisors, but it will also be possible to see their performance over time. This will allow an advisor who can start with an extremely small fund (i.e. low capitalization) to gain reputation and as the reputation increases due to potential investors having access to his actual performance results, additional investors will commit to his fund. The investor has the assurance of the investment company that the investment strategy stated by the advisor will be adhered to and investments will not be made outside of the investment strategy. Furthermore, the investor's funds are held with the investment company and not with some unknown advisor.

In some cases, particularly with relatively new advisors, the investment company may provide them with a false or fictitious designation of funds for investment. This will be clearly identified to all would be investors but it will allow an advisor to manage a fictitious portfolio according to his strategy and as such, gain reputation with respect to potential investors. There will also be a full break down between the fictitious funds and the actual funds as this may well be critical information to the investor. The information will also preferably include the amount of personal funds or a minimum level of investment that the actual advisor has in the fund. This may be stated as a dollar amount, a range, a percentage of the advisor's net worth or personal investment portfolio.

In one embodiment of the invention, the advisor will not receive compensation in a traditional manner. Mutual funds typically include some sort of management fee which is based on the net asset value of the fund and not strictly or predominately based on performance. It is seldom that a stock in a company goes to zero. Therefore, the net asset value of the fund allows for substantial fees even with poor performance. Traditional mutual funds are also typically controlled by a company that the fund manager is employed by. This raises concern that trades may be made to generate brokerage fees, as opposed to increase the likelihood of profit for the individual investors. Furthermore, professional fund managers move from fund to fund, or fund management company to fund management company, without giving advance notice to investors. In a preferred embodiment of the invention, there would be no possibility of an advisor leaving his/her fund without advising the investment company, who would immediately notify investors, then close down the fund by selling all equity.

In contrast to the above systems, in a preferred embodiment, the advisor is paid if his investment strategy is successful and individual investors have profited. The advisor will not primarily receive compensation with respect to the asset value of the fund being managed, nor would there be compensation on actual sales or transactions. Thus, the concern with respect to "brokerage churn", is not in the interest of the investor and is not in the interest of the advisor. The advisor preferably receives compensation if an investor decides to divest themselves of the particular fund and has realized a profit. If the investor divests himself of the fund and has not realized a profit, there would be no compensation. This arrangement is preferred as the only compensation, or at least the overall dominant compensation for an advisor managing the fund. An advisor may receive some compensation or incentive if new investors decide to invest.

The investment company preferably will treat each investment strategy as a mini advisor fund. New investors will be issued shares or portions of shares in the advisor fund according to the dollars invested. The investment company will manage the advisor fund in accordance with instructions received from the advisor and in accordance with the stated strategy of the advisor.

The investment strategy of each advisor is available in the investment company database. The individual investors will have confidence in the investment company for maintaining these funds as they will be properly qualified and licensed to carry out such transactions. Trust is built up with respect to the investment strategy based on financial performance. Some degree of trust is also generated based on the qualifications of the advisor as stated on his particular webpage. For example, one advisor might have significant expertise with respect to corn, as he is a farmer who specializes in this particular crop. His strategy may be to invest in corn or corn futures, or other agriculture products of his choice. The investor who reviews this advice, not only can review his expertise but can also review how his strategy has performed to date, has performed in recent times, and on the investment company database, can study recent trades or all trades of that particular advisor. The investor can also have some comfort in that the advisor profits on the basis that individual investors profit, and payable when such investors realize a profit.

The advisors have the very significant benefit of having their investment strategies reviewed and considered by a host of potential investors who would otherwise be unavailable to them. The provision of the system to allow an advisor to manage a portfolio which has not been funded but is basically funded by a fictitious amount, also allows a would-be advisor to gain reputation that may attract investors to his advisor fund. The investors will be able to accurately and fully evaluate the performance of a particular advisor, essentially on a real time basis. The advisors will be encouraged to highlight their successes, as well as explain the particular purchases that were not successful. This type of explanation will preferably be available on the individual webpages of the advisors as opposed to the database of the investment company, unless they are included in some significant comments of the advisors that are maintained on the investment company database.

In one embodiment of the invention, the investment company takes "snapshots" 34 of the advisor's personal webpages 6 and stores them in a secure fashion so that potential investors can also look at historical promotional, and other commentary from the advisor. This is in contrast to typical brokers who often conveniently forget past comments or targets.

From the above, it can be understood that an investment system has been disclosed which has advantages with respect to clearly stating investment strategies of particular advisors as well as providing effective performance evaluation tools for investigating strategies over time and based on criteria determined by preferably the investors. This investigation includes detailed trading information. A distinctive break between the fund advisor and the stock trading broker (investment company) has been made. The investments of the advisor funds are through a licensed or qualified agency and the stock transaction fees can be low, as the advisors are providing the investment advice. The actual investment strategy is being provided outside the brokerage firm and as such, there can be no conflict of interest or at least the conflict of interest has been very significantly reduced. The individual investors still have the confidence of dealing with a recognized licensed investment company and each investor has also been provided with research tools which allow full evaluation of different investment strategies.

The investor who is confronted with a "hot tip" from a friend or colleague can ask his friend or colleague whether he indeed has an investment strategy that has been identified on his webpage and recorded with the system. If he does not, the investor can suggest that this would be a valuable tool to allow would be investors to more fully consider his investment advice. Similarly, if a broker cells with particular recommendations, it would be encouraging to have their recommendations provided on a webpage for evaluation. Given that in each case, the investor is being asked to trust the investment advice, it seems only reasonable that this advice should be evaluated over time as opposed to on a one off basis. The investor can also suggest that this would be valuable in that if an advisor recommends a particular stock to the investor, the investor would also like to rely on the advisor to know specifically when to sell the stock. As opposed to buying the particular stock, the investor can buy into the fund of the advisor. With this approach, the investor will automatically invest in new "hot picks" of that particular advisor, assuming they meet the strategy as stated, and will also automatically benefit when the advisor sells the stocks at the appropriate time without fear that such advisor will forget to tell the investor when to sell.

The proposed system also allows investment clubs to effectively manage their portfolio. The individual members of the club can be purchasers in the "advisor fund of the club" with the advice of the club clearly stated and managed through the investment company. In some cases, it may be desirable to keep this strategy confidential or limited to a number of users and this is also easily accomplished and possible, according to the present strategy. Similarly, an advisor of very significant reputation may also wish to restrict purchases in his directed advisor fund. This system also recognizes there are a host of experts who have particular expertise in a certain field which has assisted them in making wise decisions. This system allows them the opportunity to offer this expertise to others and profit should the investors realize a profit.

The system will highlight the strong performers and will certainly expose the unprofitable investment decisions. Poor investment strategy over time will be very apparent. Any party who is indeed providing profitable investment advice over the long term can benefit from hosting a particular webpage. Investors can review the investment strategy with respect to recent trades as well as performance over time in both rising and falling markets.

Figure 2:
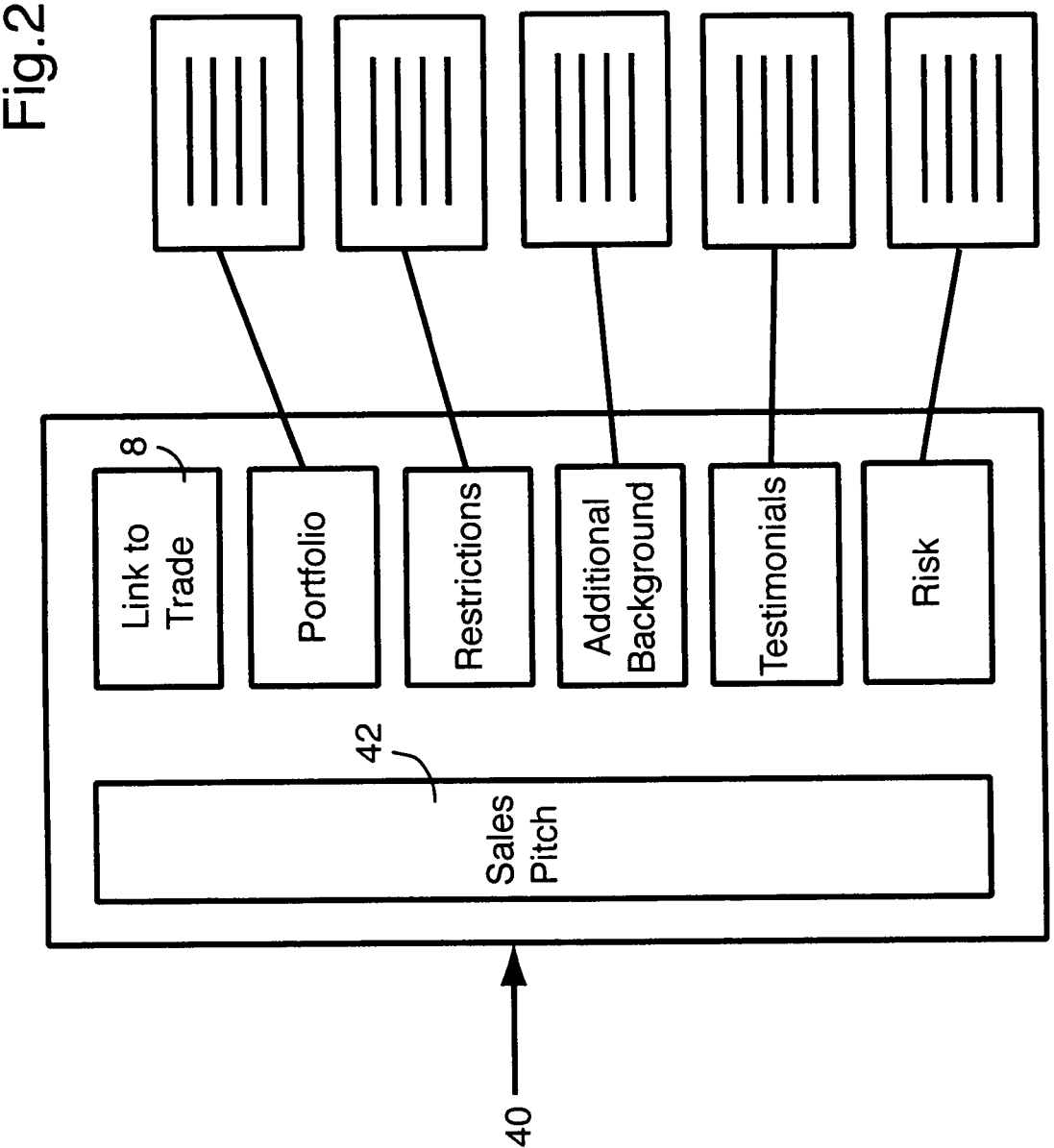
FIG. 2 shows a webpage of an advisor promoting his particular investment strategy.

FIG. 2 shows a webpage 40 of an advisor. This includes a sales promotion written by the advisor 42, as well as links to the investment company's certified portfolio details of the advisor investment strategy with the stated restrictions. Additional background information such as a testimonial section and a risk assessment may also be provided. At a minimum, the webpage includes a hyper link 8 to the investment company computer 10, and specifically to the page 33 maintained by the investment company containing certified factual information. In all cases, it will be clear to an investor which pages are providing certified information by the investment company and which pages have been allowed by the advisor or by other promoters of the advisor's fund.

Figure 3:
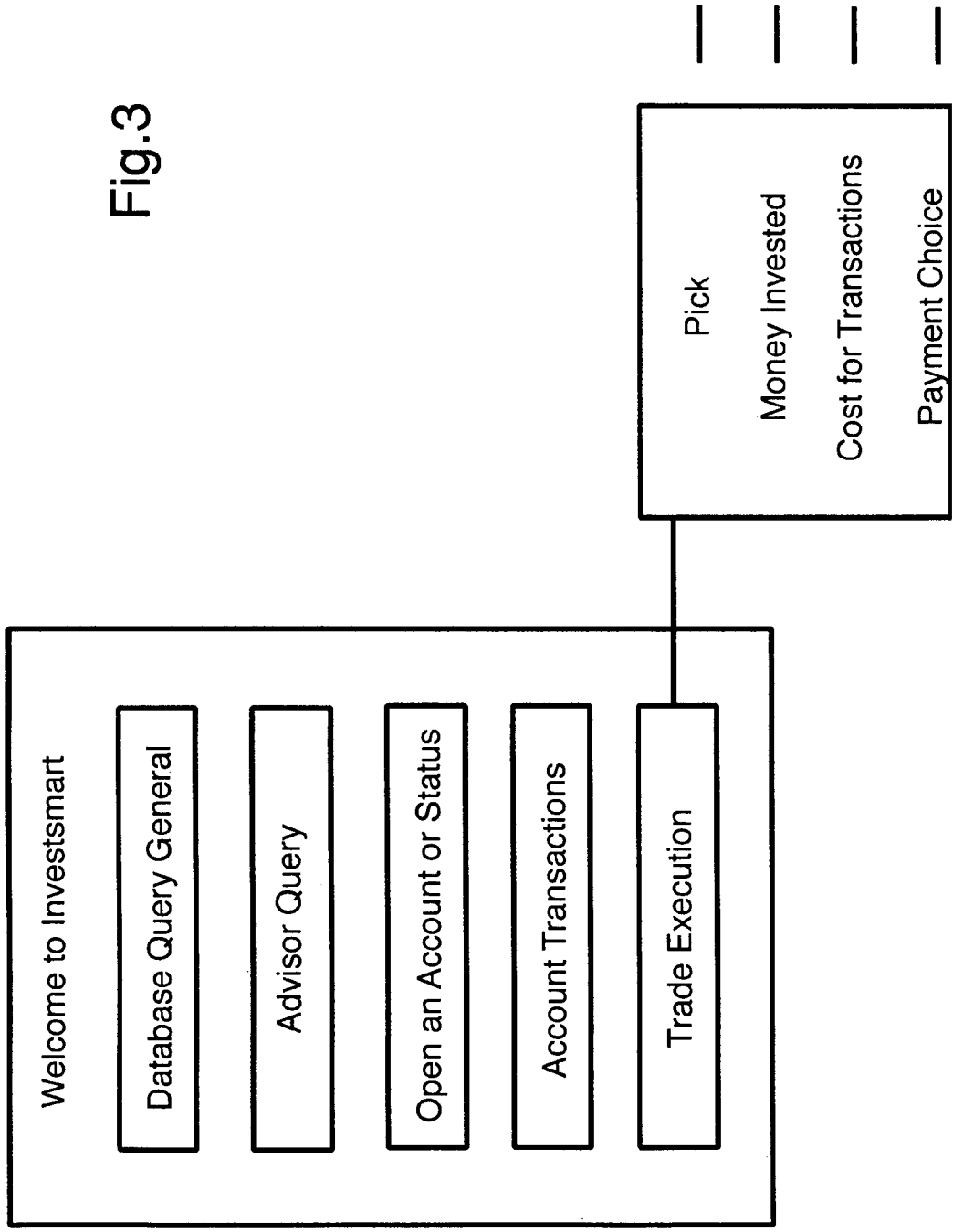
FIG. 3 shows an opening webpage of the online system which is accessed by a would be investor.

FIG. 3 shows a typical initial webpage of the investment company. It provides a number of selections that can be made to either query the database in general with respect to all advisors or a selected group of advisors, or to select a particular advisor and to query the success of the strategy of that advisor. There are also provisions to indicate that an account is to be opened, or on account status is to be obtained. An area is also provided that allows an existing customer to carry out an account transaction, or to effect trade execution.

Figure 4:
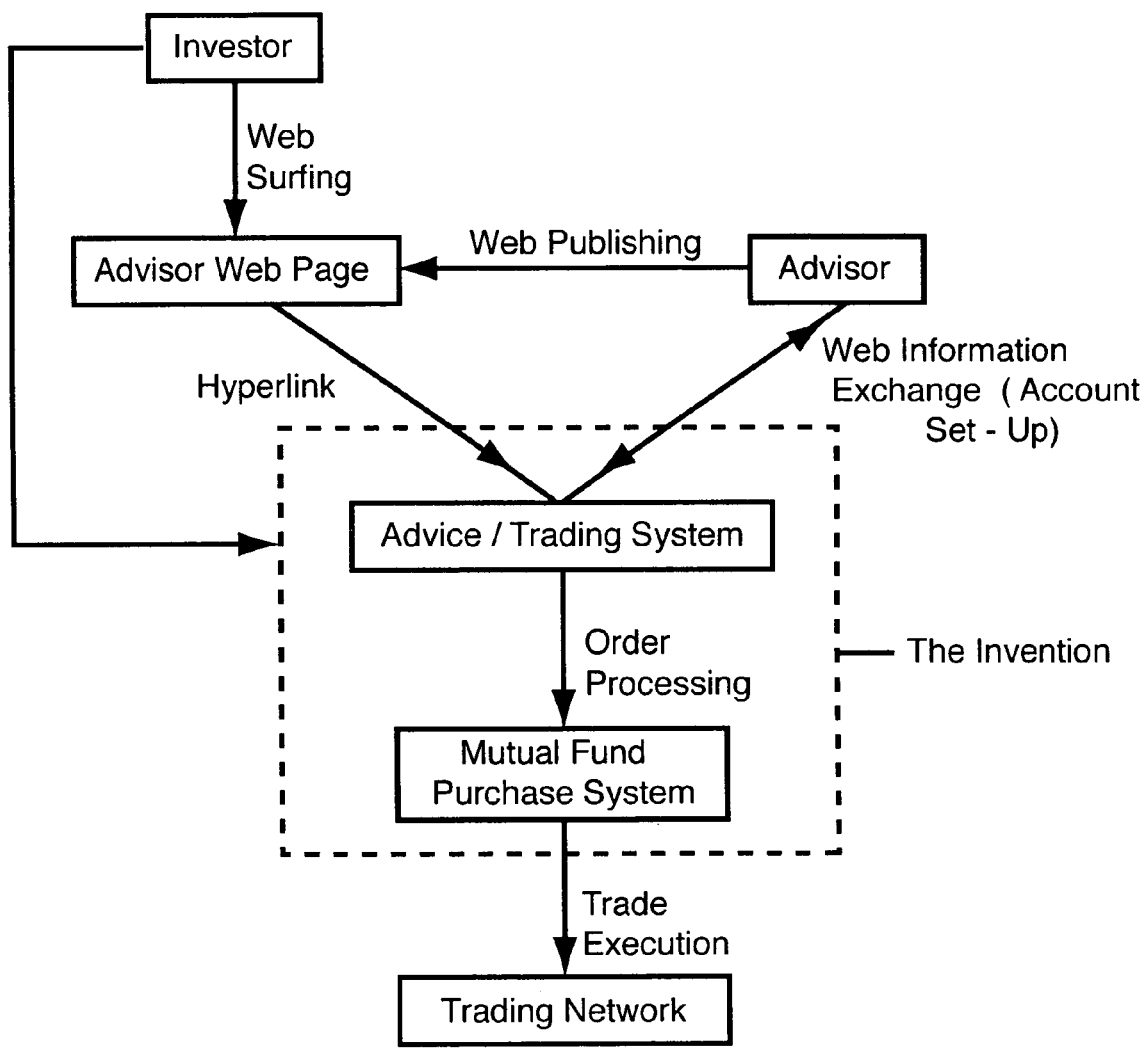
FIG. 4 shows a general overview of an investor and advisor and the online system.

FIG. 4 provides a further overview showing the investor, the advisor, the advisor's webpage, and the computer of the investment company. It is seen associated with the trading network.

Figure 5:
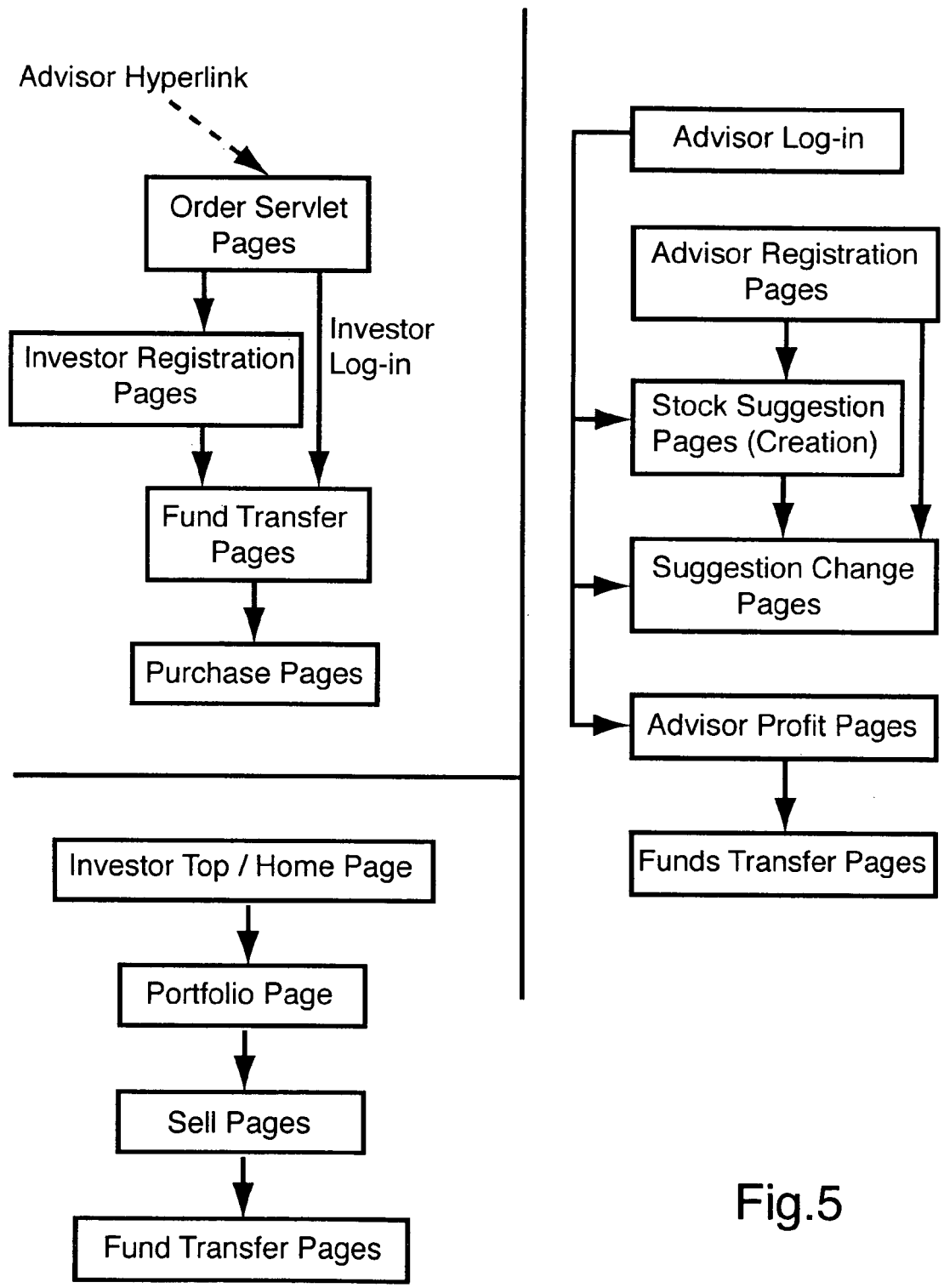
FIG. 5 shows additional details of the online system.

FIG. 5 shows further details with respect to coordination of the advisor with respect to the investment company. The ability of the investor to review his own portfolio and provide instructions as well as the hyper link from the advisor's webpage to the system.

Figure 6:
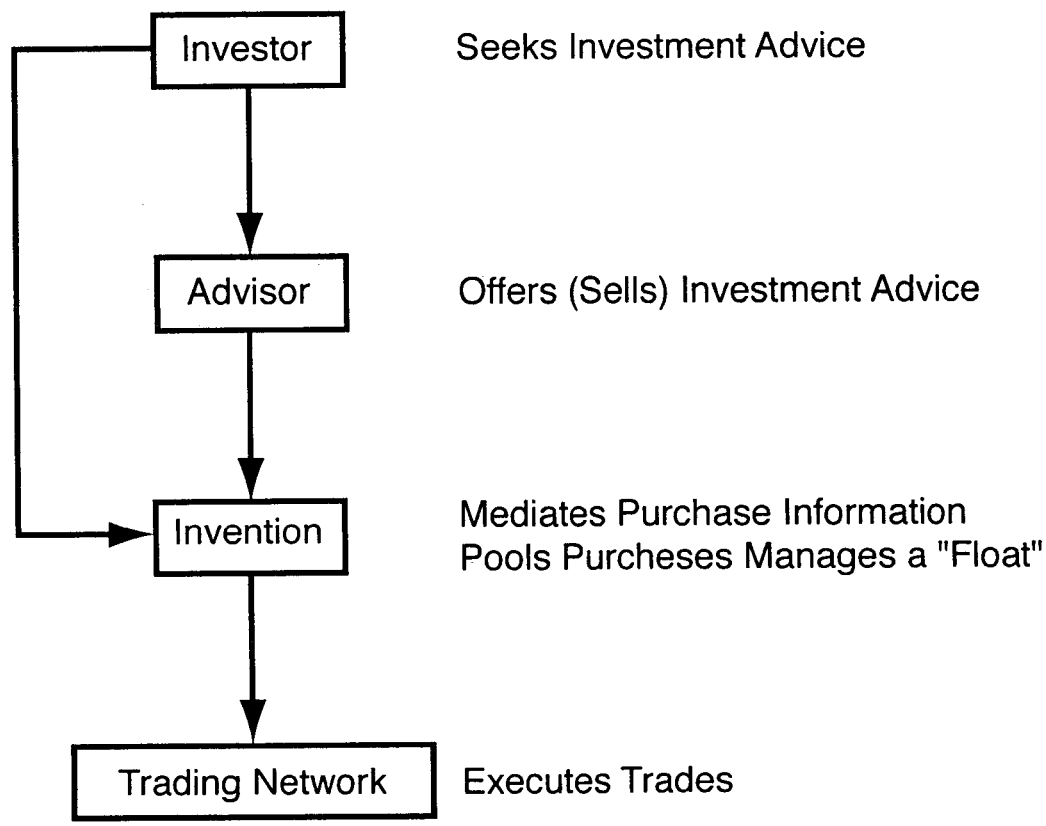
FIG. 6 shows the relationship of the investor, advisor and the online system.

FIG. 6 is a simplification showing one investor, one advisor, the investment company and the trading network.

Figure 7:
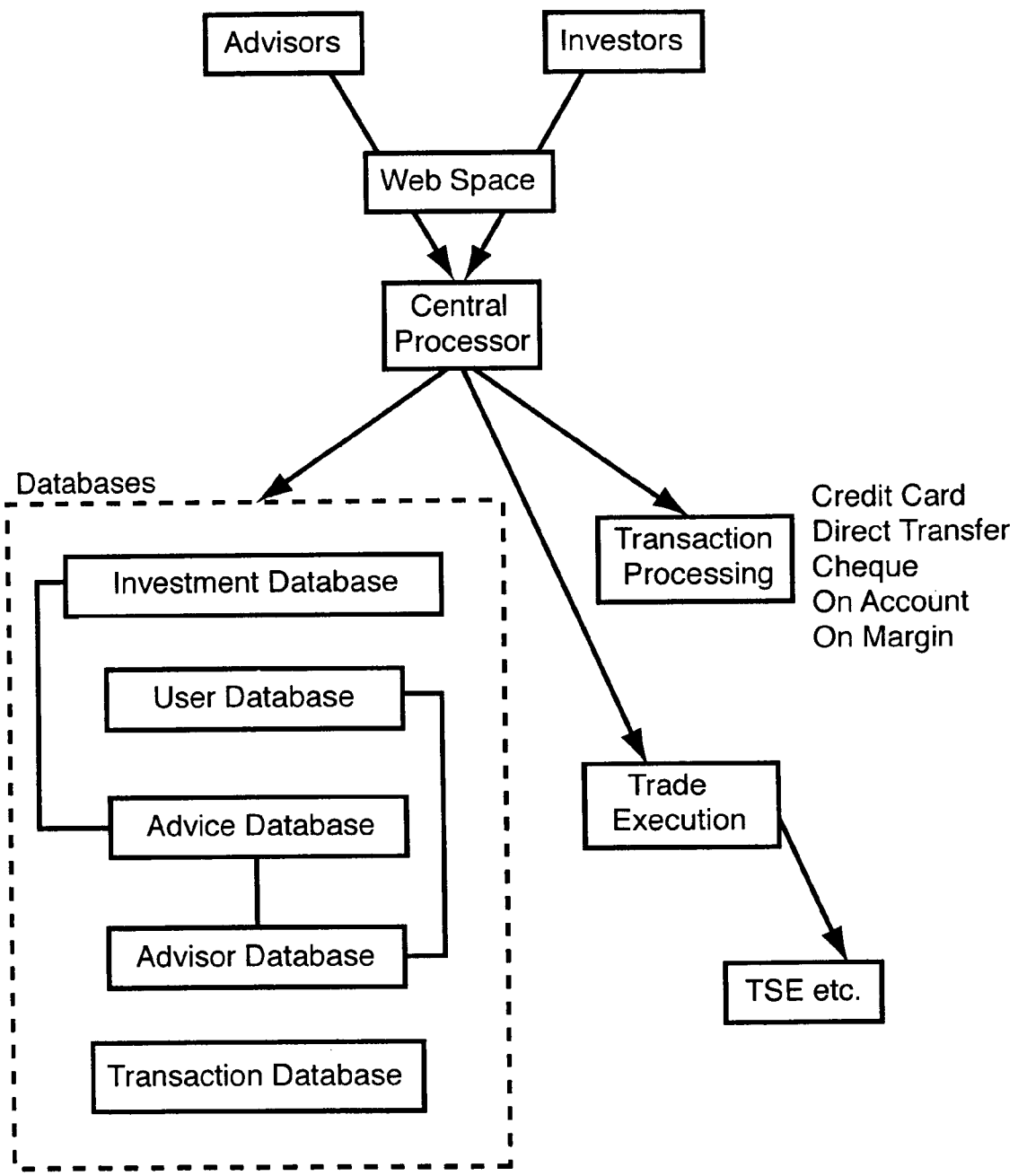
FIG. 7 shows further details of the system.

FIG. 7 is again an example of the various advisors and investors coordinated over the INTERNET and connected to a central processor of the investment company.

FIG. 8 is an example webpage 33 of the investment company providing information with respect to the advisor fund of Bill Snow. The graph shows the performance of this particular advisor fund, the average of INTERNET sector funds, and the average of all funds over time. Other fund information is provided as well as the capability to investigate the performance of the fund. This information includes current and past trade executions. This information is easily produced or maintained by a computer database system making the information conveniently available for the host of advisor funds.

FIG. 9 is a sample webpage of an advisor "Joe" explaining why he can outperform the market with his stock picks. The investment company webpage for "Joe" would merely provide the type of information found in FIG. 8.

FIG. 10 is a webpage that allows an advisor to define a particular fund. The advisor of the fund is encouraged to restrict the fund and thus, restrict the advisor. This provides the potential investors with a higher level of confidence as they probably do not know the advisor but may agree that his restricted investments look good.

Returning to FIG. 1, it can be seen that the computer system 10 of the investment company also allows coordination 18 with the various advisors. It also allows coordination with the individual investors shown as 20. The coordination with the advisors is necessary to allow the investment company to obtain instructions from the different advisors with respect to the direction of his fund. For example, when additional funds are allocated to be invested, according to a particular investment strategy, the advisor may receive detailed information with respect to the amount of funds that should be invested and can provide instructions that meet his investment strategy to the investment company. In some cases, the advisor may wish to merely maintain a particular investment strategy by increasing the number of shares of the previously identified stocks. Other funds could be indicated as being placed on hold, awaiting the advisor's instructions or the advisor could have standing instructions with respect to investment of additional funds. In the event that investors withdraw funds, the advisor can also post instructions as to which stocks are to be sold first, and at what proportions.

The present system has been described as a host of advisor funds which are maintained by the investment company on behalf of the individual investors. An investment of a particular investor is made by the purchase of shares of the advisor fund. The investor can be provided with a clear indication of any front end costs to enter this investment. For example, it may be appropriate that particular investor is charged with the transaction fees which are necessary to obtain further purchases in the fund. In this way, existing investors are not paying for the additional purchases of stock merely to bring in an new investor. These types of costs can be stated to the investor over the web at the time he wishes to make his investment, he can review these costs and decide whether the investment should go forward. Other arrangements are possible.

The present system also allows for immediate investment by a new investor based on a credit card authorization.

The description of this system based on a series of advisor funds is not the only embodiment. There may be other embodiments that meet the criteria of different licensing regulations and these are also acceptable. The term "advisor fund" has been used merely to indicate a mutual fund type operation but it is not limited to this case. It can be appreciated that all funds may not operate in the same manner. There can be a host of investment advisors and the advisors merely put forth their particular expertise and individual investors decide whether this would be a good investment decision. The investment strategy of the advisor is clearly stated and recorded with the investment company. Thus the investor is assured that the advisor cannot suddenly decide to divest himself of all his blue chip stocks and decide to invest in some investment which was not previously identified without notice of a change in his strategy.

Furthermore, "automated" advisors, which are computer algorithms for selecting stocks based on clearly defined criteria, are also possible under this invention.

The invention also allows for the definition of investment strategies by "automated advisors". In those cases, the advisor is not a person or group, but is instead, a computer generated or general industry generated "expert". For example, an "INTERNET Casino Fund" would be automatically generated as equal proportions of all INTERNET based casinos, or casinos weighed by market capitalization, or by sales. Similarly, a "Halifax Economy" fund of all stocks in Halifax could be automatically generated.

The system is particularly designed to take advantage of the benefits of the INTERNET and investors preferably will be contacted by e-mail. Notice of potential changes to the investment strategy, for example, can be sent to the individual investors and such investment strategy will not be adopted until a certain period of time has expired. If an investor is not satisfied or is concerned with respect to the risk that this change in direction may bring, he can divest himself of the fund prior to the change in strategy, being implemented.

This invention also allows for investors to be notified as soon as a transaction occurs in any advisor fund they are participating in, or monitoring. Criteria for automated generation of such e-mail or other notification (paper, etc.) might include buying or selling of any equity, buying or selling of a specifically identified equity, selling any equity at a loss or gain, or a loss or gain greater than a certain percentage.

Rather than viewing his/her portfolio as a series of investments in advisor funds, an investor could also see the net results of all advisor funds. Such net results could show total holdings of each stock (or other investment) broken down by advisor fund and daily, weekly, monthly or yearly trades. A breakdown for one investor is shown in FIG. 11. The first table provides a listing of three separate advisor funds with their current value, book value and day change. The second table is a collection of the portfolio listing the top five security exposures. This provides a useful tool to determine whether the collective portfolio is over exposed to several securities or is well diversified.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A method of independent investors investing in one or more of a series of unrelated investment portfolios maintained on behalf of individual investors by a licensed investment entity using a computer system of the licensed investment entity and having an investment account for each individual investor, said method comprising:
  accessing an online computer having detailed information regarding each investment portfolio including
  a profile of a registered advisor responsible for the purchase and sale of financial instruments of the investment portfolio specifying any of the registered advisor's educational qualifications, job experience and investment experience, and additionally specifying
  an investment strategy of the portfolio with specific restrictions regarding the financial instruments available for purchase within the portfolio;
  using the computer system of the licensed investment entity to track changes in each of said series of unrelated investment portfolios and specific restrictions thereof on behalf of independent investors using the investment accounts;
  receiving electronic instructions from independent investors with respect to a purchase or sale of any of the unrelated investment portfolios and executing the sale or purchase, via the computer system of the investment entity, in accordance with the received instructions;
  sending electronic notice, via the computer system of the investment entity to any of the registered advisors, of additional funds to be invested or funds to be divested in the respective investment portfolios;
  receiving electronic instructions at the computer system of the investment entity from any of the registered advisors, with respect to additional funds, to purchase financial instruments for the respective portfolios, and purchasing the same when the financial instruments meet the specific restrictions of the respective investment portfolios;
  receiving, at the computer system of the investment entity, electronic instructions from any of said registered advisors to sell financial instruments in the respective investment portfolio and executing the sale thereof including the sale associated with instructions specific to funds to be divested in the particular investment portfolio;
  accessing an online searchable database by investors and non-investors containing full details of past purchases and sales of financial instruments of each investment portfolio whereby investors have sufficient detailed information to conduct their own online research and assessment of the actual performance of any of the series of unrelated portfolios.

2. A method as claimed in claim 1 including the steps of
  accessing the online computer system and selecting an investment portfolio registration process and entering information to establish a new investment portfolio and an individual as a registered advisor thereof;
  said registration process including specifying the profile of the registered advisor and the investment strategy of the new investment portfolio with the specific restrictions; and
  accepting and adding the new portfolio to the series of investment portfolios maintained via the computer system of the licensed investment entity.

3. A method as claimed in claim 1 wherein accessing the online searchable database accommodates querying of the searchable database with respect to one or more investment portfolios and providing accurate time information of actual purchase or sale of financial instruments associated therewith.

4. A method as claimed in claim 2 wherein accessing the online searchable database accommodates querying of the searchable database with respect to one or more investment portfolios and providing accurate time information of actual purchase or sale of financial instruments associated therewith.

5. A method as claimed in claim 1 including providing via the computer system of the investment entity financial compensation to the registered advisor of an investment portfolio upon a sale of all or part of the respective investment portfolio by individual investors that realized a profit.

6. A method as claimed in claim 2 including providing via the computer system of the investment entity financial compensation to the registered advisor of an investment portfolio upon a sale of all or part of the respective investment portfolio by individual investors that realized a profit.

7. A method as claimed in claim 1 including providing electronic notice via the computer system of the investment entity for each investment portfolio of a change in the specific restrictions of the investment portfolio.

8. A method as claimed in claim 2 including providing electronic notice via the computer system of the investment entity for each investment portfolio of a change in the specific restrictions of the investment portfolio.

* * * * *